United States Patent [19]
Yamada

[11] Patent Number: 5,319,495
[45] Date of Patent: Jun. 7, 1994

[54] ZOOM LENS
[75] Inventor: Hiroshi Yamada, Omiya, Japan
[73] Assignee: Fuji Photo Optical Company, Ltd., Saitama, Japan
[21] Appl. No.: 966,742
[22] Filed: Oct. 26, 1992
[30] Foreign Application Priority Data
  Oct. 25, 1991 [JP] Japan .................. 3-279688
[51] Int. Cl.$^5$ ............................. G02B 15/14
[52] U.S. Cl. .................... 359/691; 359/649
[58] Field of Search .............. 359/691, 692, 649
[56] References Cited
U.S. PATENT DOCUMENTS
  5,005,955 4/1991 Ohshita .................. 359/691 X
FOREIGN PATENT DOCUMENTS
  3-120507 5/1991 Japan .

Primary Examiner—Scott J. Sugarman
Attorney, Agent, or Firm—Keck, Mahin & Cate

[57] ABSTRACT

A zoom lens includes, from the image side to the subject side, a first lens group having a negative overall power and a second lens group having a positive overall power. The lens groups are movable relative to each other in opposite directions so as to increasingly and decreasingly change an axial air spacing between the two lens groups, thereby continuously varying the focal length of the zoom lens. The zoom lens satisfies the following conditions:

$$2.5 < bf_w/f_w, \text{ and}$$

$$0.68 < f_1/f_2 < 0.98,$$

where $bf_w$ is the axial distance measured from the rearmost surface of the second lens group to a conjugate point at a long conjugate length of the second lens group for the wide-angle end, $f_w$ is the overall focal length of the zoom lens for the wide-angle end, $f_1$ is the overall focal length of the first lens group, and $f_2$ is the overall focal length of the second lens group.

4 Claims, 7 Drawing Sheets

ZOOM LENS

BACKGROUND OF THE INVENTION

1. Field of the Invention

The present invention relates to a zoom lens and, more particularly, to a zoom lens comprising two lens groups which is particularly suitable for use with a three liquid crystal plate projector.

2. Description of Related Art

Various types of apparatuses have heretofore been used to project a color image on a remote screen. A type of such projection apparatuses have three liquid crystal display elements in the form of a plate for displaying achromatic images. Such a projector is called a "three liquid crystal plate projector (which is hereinafter referred to as a 3CLD projector for simplicity)."

3LCD projectors typically include a projection optical system having a transmitting type of liquid crystal display elements, formed as flat plates, (which are hereinafter referred to as LCD plates for simplicity), for displaying three achromatic component images, corresponding to primary monochromatic component images; namely, red, green and blue component images, of an intended color image. The achromatic component images displayed on the liquid crystal display plates are translated into three monochromatic component images, namely, red, green and blue component images, by the use of three dichroic mirrors. The red, green and blue component images are then composed and projected by a projection lens as a color image on a remote screen.

In a projection optical system of the 3LCD projector, since there must be provided a number of optical mirror elements, for instance, at least three dichroic mirrors and three reflection mirrors, as well as three LCD plates, the projection lens must have a long back focal length between the projection lens and each of the LCD plates.

Zoom lenses comprising, for instance, four or five lens groups are preferably available as projection lenses having a relatively long back focal length and desirable optical characteristics. Such a zoom lens, however, unavoidably has a long overall length and a large diameter of a foremost lens. This leads to a 3LCD projector of a large size.

There has been proposed, as an improved projection lens, a zoom lens having a reduced number of, for instance two, lens groups and a long back focal length. Such is described in Japanese Unexamined Patent Publication No. 3-120,507. This zoom lens satisfies the following conditions:

$$bf_w/f_w > 1.6$$

$$0.8 < -e_w/f_I < 2$$

$$1 < -f_I/f_{II} < 1.5$$

where $bf_w$ is the rear vertex distance measured from the rear surface of the rearmost lens component of the second lens group and a rear conjugate point for the wide-angle end;

$f_w$ is the overall focal length of the zoom lens for the wide-angle end;

$f_I$ is the focal length of the first lens group;

$f_{II}$ is the focal length of the second lens group; and $e_w$ is the distance between a principal point of the first lens group and a principal point of the second lens group.

In order to allow viewers or spectators to see an image projected on a remote screen by a 3LCD projector at any desired location on a floor, it is generally preferred to suspend the 3LCD projector from the ceiling rather than to place it on the floor or, otherwise, on a table. For this reason, the 3LCD projector desirably has a horizontal arrangement of optical elements, in which dichroic mirrors and reflection mirrors are disposed in two parallel straight lines separated horizontally, so as to have a flat and thin shape.

However, because screens are generally oblong in geometry and, when the projector has a horizontal optical arrangement, each of the optical elements must be oblong in geometry, an optical path has a long distance between the rearmost surface of the optical system of the projection lens and each CLD plate. Consequently, the projection lens must have a long back focal length.

If the zoom lens described in the publication mentioned above is used with a 3LCD projector having a horizontal arrangement of projection optical elements, the back focal length of the zoom lens is not always sufficiently long.

SUMMARY OF THE INVENTION

It is, therefore, an object of the present invention to provide a zoom lens which has a sufficiently long back focal length even when used with a 3LDC projector having a horizontal arrangement of projection optical elements.

The foregoing object is achieved by providing a zoom lens comprising, from the image side, or screen side a first lens group having a negative overall power and a second lens group having a negative overall power, which are movable relative to each other in opposite directions so as to increasingly and decreasingly change an axial air spacing between the two lens groups, thereby continuously varying its focal length. The zoom lens satisfies the following conditions:

$$2.5 < bf_w/f_w \quad (1)$$

$$0.68 < f_1/f_2 < 0.98 \quad (2)$$

where $bf_w$ is the axial distance measured from the rearmost surface of the second lens group to a conjugate point at a long conjugate length of the second lens group for the wide-angle end;

$f_w$ is the overall focal length of the zoom lens for the wide-angle end;

$f_1$ is the overall focal length of the first lens group; and $f_2$ is the overall focal length of the second lens group.

In the zoom lens, designating the magnification of the second lens group (which is a negative value) from a long conjugate length to a short conjugate length as M, a back focal length bf of a thin lens system is represented by the following equation:

$$bf = f_2(1 - M) \quad (3)$$

From this equation (3), the back focal length bf is a minimum at the wide-angle end where an absolute value of the magnification M is minimum. As long as the zoom lens satisfies the condition (1), it certainly has a back focal length $bf_w$ at the wide-angle end sufficiently long for a 3LCD projector which has a horizontal arrangement of optical elements.

The overall length of a thin lens system L for a subject at an infinite distance is represented by the following equation:

$$L = f_2(1 - 1/M) + f_1 \quad (4)$$

Letting $f_w$ and $M_w$ be the overall focal length of the zoom lens at the wide-angle end and the magnification at the wide-angle end, respectively, the overall focal length $f_w$ is represented by the following equation:

$$f_w = f_1 \times M_w \quad (5)$$

Because the overall focal length $f_w$ is previously given, the magnification $M_w$ is absolutely determined according to the overall focal length $f_1$ of the first lens group.

As is apparent from the above equation (3), because, as the overall focal length $f_1$ of the first lens group is decreased, the magnification $M_w$ for the wide-angle end and, hence, the absolute value of the magnification M become large, the back focal length $bf_w$ can be large.

However, if the ratio of overall focal length between the first and second lens groups $(f_1/f_2)$ is smaller than the lower limit of 0.68, the zoom lens results in having the front vertex distance measured from the front surface of the lens on the image (screen) side to the rear conjugate point (which is represented by $bf_T + L$) which is too large for the telephoto end to allow 3LCD projectors for use the zoom lens to be made compact in size. On the other hand, if the overall focal length $f_1$ of the first lens group is large and, accordingly, the ratio of overall focal length between the first and second lens groups $(f_1/f_2)$ is larger than the upper limit of 0.98, the absolute value of the magnification M becomes small. As a result, as is apparent from the above equation (4), the overall length of the zoom lens $L_w$ becomes long for the wide-angle end.

Further, when the absolute value of the magnification M is small, as is apparent from the equation (3), it is difficult to provide the zoom lens with a long back focal length $bf_w$ for the wide-angle end. According to the equation (3), it can be said that even though the absolute value of the magnification M is small, if the overall focal length $f_2$ of the second lens group is long, the zoom lens may have a long focal length $bf_w$ for the wide-angle end. However, as is apparent from the equation (4), as the overall focal length $f_2$ of the second lens group becomes larger, the zoom lens increases its overall length L so that it becomes undesirably longer.

BRIEF DESCRIPTION OF THE DRAWINGS

The above and other objects and features of the present invention will be understood, by those skilled in the art, from the following detailed description of preferred embodiments when considered in conjunction with the drawings, in which.

DETAILED DESCRIPTION OF THE PREFERRED EMBODIMENTS

Figure 1:
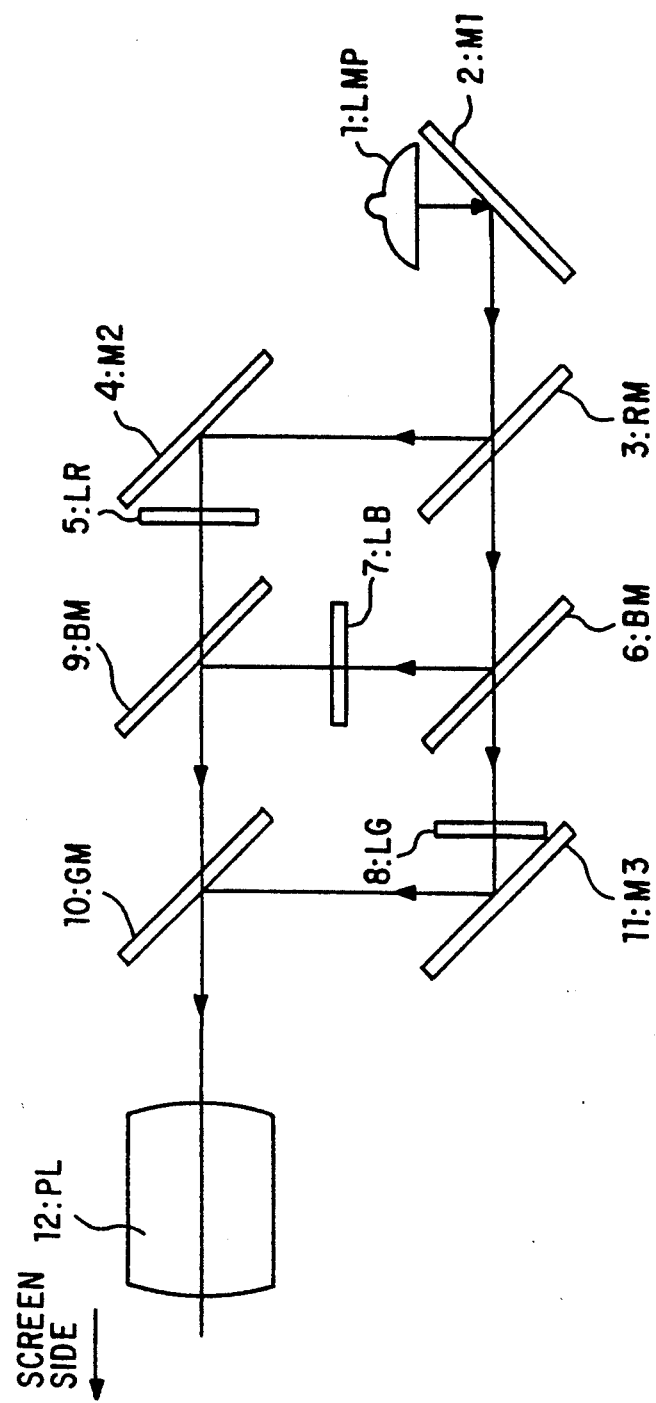
FIG. 1 is a schematic illustration of an optical system of a 3LCD projector with which a zoom lens of the present invention is used.

Before describing the present invention in detail, reference is made to FIG. 1 for the purpose of providing a brief description of a 3LCD projector for use with a zoom lens according to the present invention that will enhance an understanding of the zoom lens.

FIG. 1 shows an optical arrangement of a 3LCD projector in which three transmitting type liquid crystal display elements (LR, LG and LB) 5, 7 and 8 are provided in the form of a flat plate. The liquid crystal display plates (LR, LG, LB) 5, 7 and 8 display achromatic images corresponding to primary color and monochromatic images of an intended color image, namely, red, green and blue component images, respectively. Such liquid crystal display plates and manners of displaying achromatic component images of a color image thereon are well known in the art. All the liquid crystal display plates (LR, LG, LB) 5, 7 and 8 are positioned at the same distance from a rearmost surface of the zoom lens (PL) 12. This is equivalent to a focal length of the zoom lens or at a rear conjugate point of the zoom lens.

In order to translate the achromatic images displayed on the liquid crystal display plates (LR, LG, LB) 5, 7 and 8 into monochromatic images, there are disposed dichroic mirrors (RM, BM, BM GM) 3, 6, 9 and 10 and reflection mirrors (M1, M2, M3) 2, 4 and 11. These monochromatic component images are composed and projected by the zoom lens (PL) 12 on a remote screen (not shown) as a color image. As is well known in the art, the dichroic mirrors (RM, BM, BM, GM) 3, 6, 9 and 10, respectively, reflect a red component (R), a blue component (B) and a green component (G) from white light but pass all other components. White light emanating from a light source (LMP) 1, such as a lamp, is reflected by a reflection mirror (M1) 2 disposed in an optical axis $X_s$, which is in parallel with a principal optical axis $X_p$ of a projection lens, such as a zoom lens (PL) 12, at 45 degrees. In the principal optical axis $X_p$, there are disposed, from the zoom lens (PL) 12, the green dichroic mirror (GM) 10, the blue dichroic mirror (BM) 9 and the reflection mirror (M2) 4, all of which are at 45 degrees with respect to the principal optical axis $X_p$ and in parallel with one another. In the adjoining optical axis $X_s$, there are disposed, from the zoom lens (PL) 12, the reflection mirror (M3) 11, the blue dichroic mirror (BM) 6 and the red dichroic mirror (RM) 3, all of which are at 45 degrees with respect to the principal optical axis $X_p$ and in parallel with one another. The green dichroic mirror (GM) 10, the blue dichroic mirror (BM) 9 and the reflection mirror (M2) 4 correspond to the reflection mirror (M3) 11, the blue dichroic mirror (BM) 6 and the red dichroic mirror (RM) 3, respectively. The liquid crystal display plate (LR) 5 is disposed between the reflection mirror (M2) 4 and the blue dichroic mirror (BM) 9. The liquid crystal display plate (LB) 7 is disposed between the blue dichroic mirror (BM) 6 and the blue dichroic mirror (BM)

9. The liquid crystal display plate (LG) 8 is disposed between the blue dichroic mirror (BM) 6 and the reflection mirror (M3) 11.

After the white light emanating from the light source (LMP) 1 is reflected by the reflection mirror (M1) 2, only a red component of the light is reflected by the red dichroic mirror (RM) and then by the reflection mirror (M2) 4. The red component of the light illuminates the crystal display plate (LR) 5 to translate the achromatic image into a red component image. After passing the red dichroic mirror (RM) 3, a blue component of the light is separated from a green component of the light and reflected by the blue dichroic mirror (BM) 6. The blue component of the light illuminates the crystal display plate (LB) 7 to translate the achromatic image into a blue component image. The green component of the light passed by the blue dichroic mirror (BM) 6 illuminates the crystal display plate (LG) 8 to translate the achromatic image into a green component image. The red component image, after passing the blue dichroic mirror (BM) 9 and the green dichroic mirror (GM) 10, in order, is focused by the zoom lens (PL) 12 on a screen (not shown) remote from and forward of the zoom lens (PL) 12. Similarly, the blue component image, after passing the blue dichromatic mirror (BM) 9 and the green dichroic mirror (GM) 10, in order, is focused by the zoom lens (PL) 12 on the screen. The green component image, after being reflected by the reflection mirror (M3) 11 and the green dichroic mirror (GM) 10, in order, is focused by the zoom lens (PL) 12 on the screen. Since all the crystal display plates (LR, LB, LG) 5, 7 and 8 are positioned at the same distance equivalent to the back focal length of the zoom lens (PL) 12, the red, blue and green component images are sharply focused on the screen by the zoom lens (PL) 12, a clear color image is projected on the screen.

Figure 2:
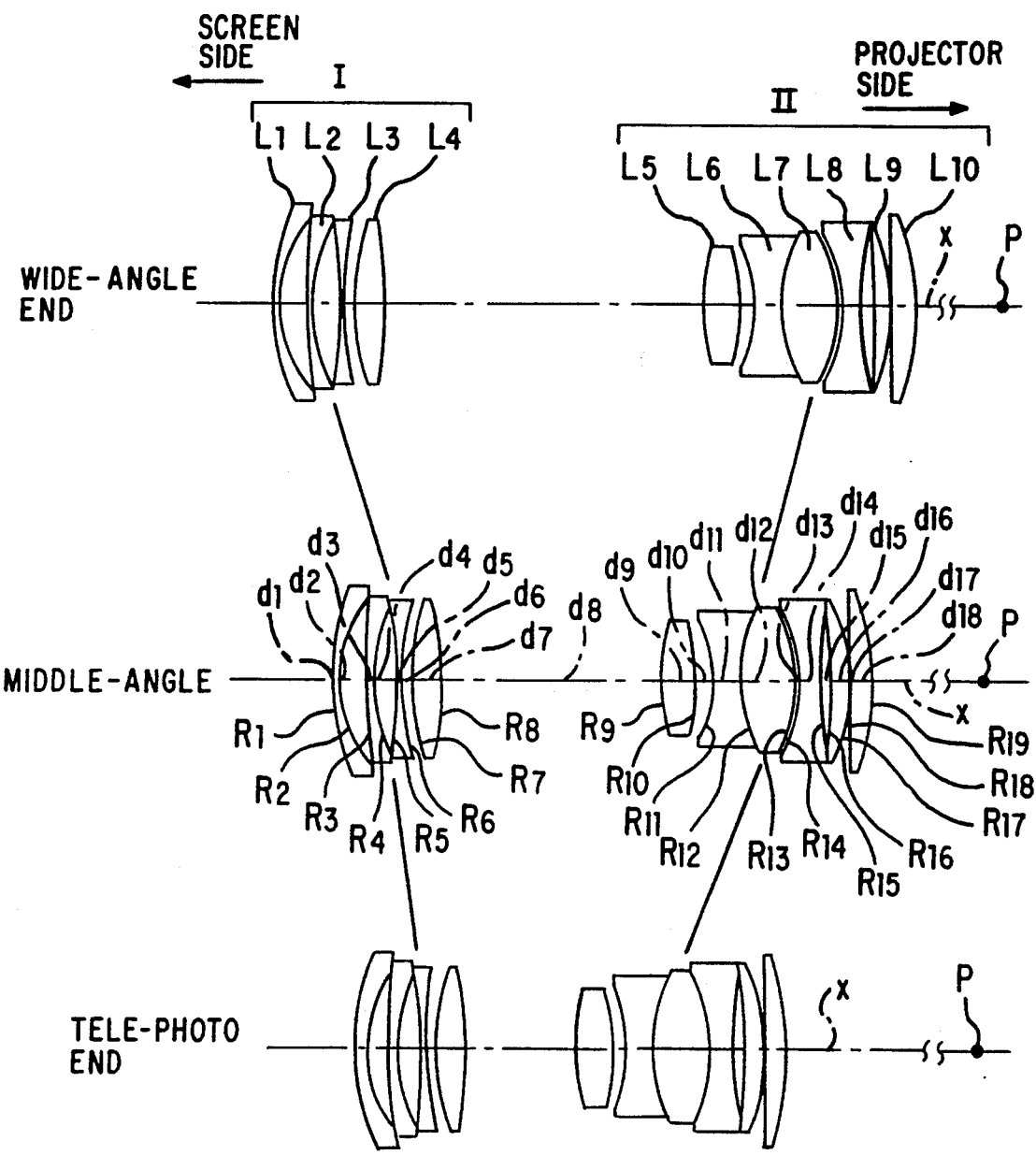
FIG. 2 is a diagramatic side view of a zoom lens in accordance with a preferred embodiment of the present invention.
Figure 3:
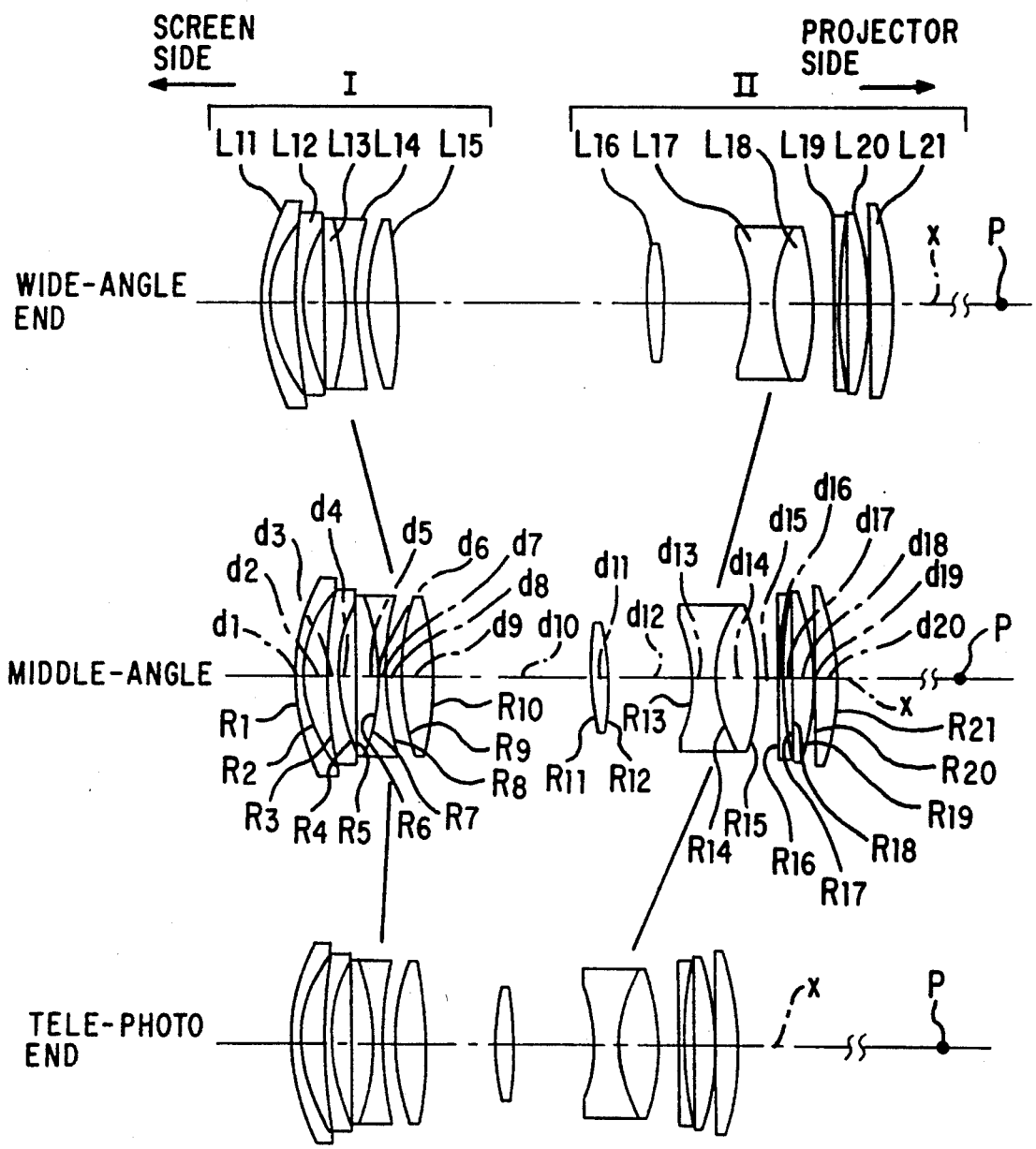
FIG. 3 is a diagramatic side view of a zoom lens in accordance with another preferred embodiment of the present invention.
Figure 4:
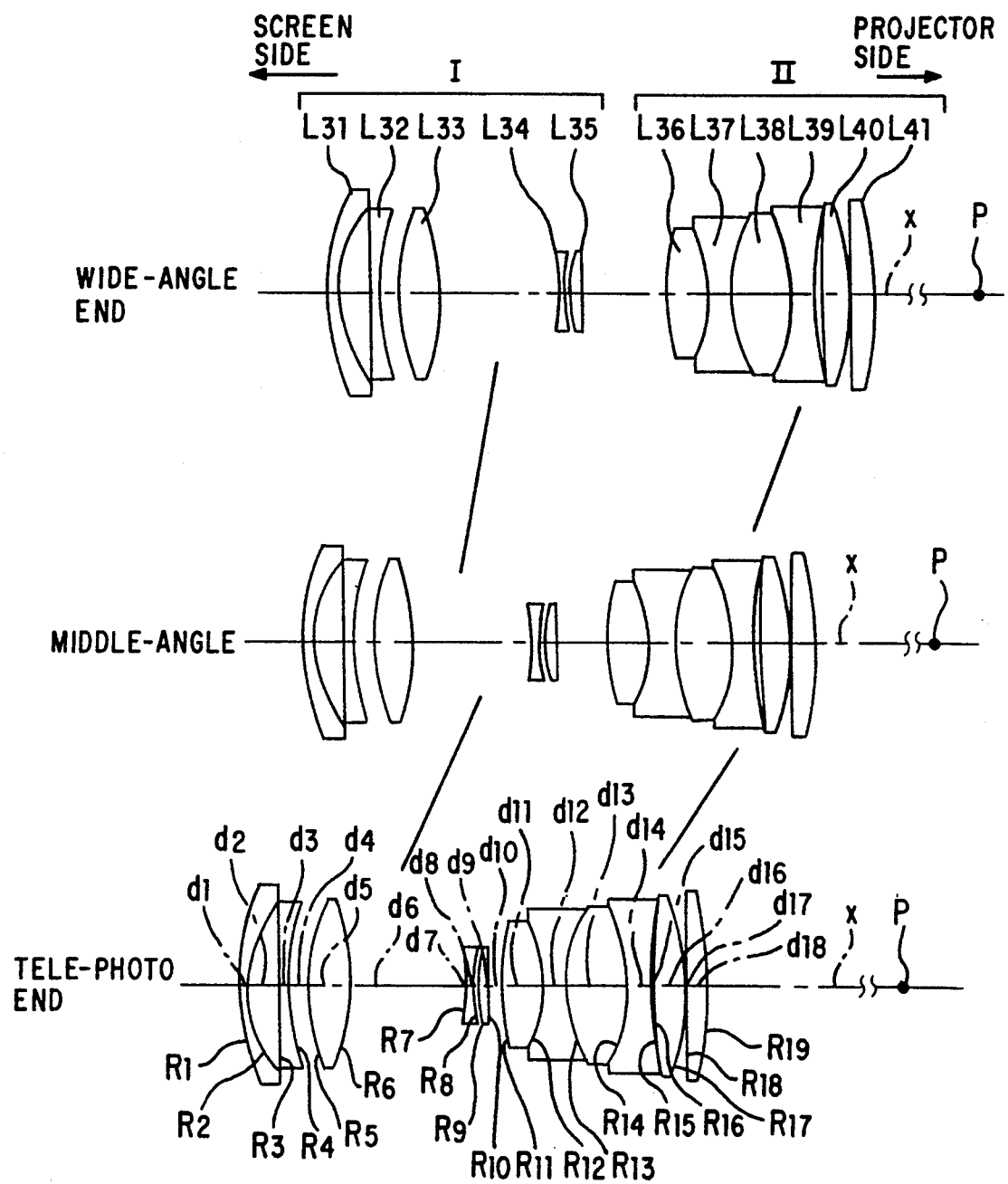
FIG. 4 is a diagramatic side view of a zoom lens in accordance with still another preferred embodiment of the present invention.

FIGS. 2 to 4 show zoom lens systems in accordance with preferred embodiments of the present invention. All of these systems comprise two lens groups and long back focal lengths. It is to be noted that in the following tables I, II and III specifically relating to the zoom lenses shown in FIGS. 2 to 3, respectively, the reference L followed by an arabic numeral indicates the lens component progressively from the image side (the screen side) to the subject side. The reference radius numbers R are the progressive lens surface radii. Positive surface radii are struck from the right of the lens surface on the optical axis X. Negative surface radii are struck from the left of the lens surface on the optical axis X. The reference distance numbers d are the progressive axial distance between surfaces. $N_d$ is the index of refraction of the lens component for D line spectrum. $V_d$ is the Abbe number of the lens component for D line spectrum.

Referring to FIG. 2, the zoom lens shown includes a first lens group I, movable for focusing and zooming, and a second lens group II, movable for zooming. The first lens group I, which has a negative overall power, comprises, as viewed from the image (screen) side, first to fourth lens components L1–L4. Specifically, the first and second lens components L1 and L2 comprise negative meniscus lenses, respectively, each of which is convex relative to the image (screen) side. The third lens component L3 comprises a bi-concave lens, and the fourth lens component L4 comprises a bi-convex lens. The second lens group II, which has a positive overall power, comprises, as viewed from the image (screen) side, sixth to tenth lens components L5–L10. Specifically, the fifth lens component L5 comprises a bi-convex lens. The sixth and seventh lens components L6 and L7 comprise, respectively, a bi-concave lens and a bi-convex lens and are cemented to each other. The eighth lens component L8 comprises a bi-concave lens. Both the ninth and tenth lens components L9 and L10 comprise positive meniscus lenses, each of which is convex relative to the subject side. Both the first and second lens groups I and II are movable along the optical axis X relative to each other so as to continuously vary a focal length of the optical system during zooming. When zooming up form a telephoto end (T) to a wide-angle end (W), the first and second lens groups I and II are moved in opposite directions so as to decrease a distance d8 therebetween.

The zoom lens shown in FIG. 1 has properties which may be defined by the following equations:

$$bf_w/f_w = 2.63$$

$$f_1/f_2 = 0.97$$

$$f_c/f_2 = 0.29$$

where
$f_1$ is the focal length of the first lens group I;
$f_2$ is the focal length of the second lens group II;
$f_w$ is the total focal length of the zoom lens at the wide-angle end;
$bf_w$ is the axial distance from the rear surface of the fourth lens component L10 of the second lens group II to a conjugate point P of the zoom lens on the subject side with respect to the zoom lens; and
$f_c$ is the focal length of a first one of two concave lens of the second lens group II from the image (screen) side.

The properties of the zoom lens shown in FIG. 2 is specifically described in the following Table I.

TABLE I

| Component | Radius of Curvature (mm) | Axial Distance Between Surfaces (mm) | $N_d$ | $V_d$ |
|---|---|---|---|---|
| L1 | R1 = 89.316 | d1 = 3.00 | 1.800 | 47.9 |
|  | R2 = 48.437 | d2 = 10.10 |  |  |
| L2 | R3 = 192.132 | d3 = 3.00 | 1.800 | 47.9 |
|  | R4 = 75.376 | d4 = 8.56 |  |  |
| L3 | R5 = −287.895 | d5 = 3.00 | 1.799 | 47.9 |
|  | R6 = 225.146 | d6 = 2.66 |  |  |
| L4 | R7 = 82.196 | d7 = 11.17 | 1.618 | 36.1 |
|  | R8 = −175.889 | d8 (Variable) |  |  |
| L5 | R9 = 103.111 | d9 = 13.48 | 1.500 | 54.9 |
|  | R10 = −84.622 | d10 = 6.25 |  |  |
| L6 | R11 = −51.016 | d11 = 9.00 | 1.641 | 59.4 |
| L7 | R12 = 56.948 | d12 = 22.23 | 1.642 | 59.4 |
|  | R13 = −54.657 | d13 = 0.20 |  |  |
|  | R14 = −64.669 |  |  |  |
| L8 | R15 = 264.366 | d14 = 9.00 | 1.799 | 25.0 |
|  | R16 = −321.759 | d15 = 3.66 |  |  |
| L9 | R17 = −77.232 | d16 = 7.42 | 1.571 | 62.2 |

TABLE I-continued

| L10 | R18 = −3050.969 | d17 = 0.20 | | |
| | | d18 = 7.66 | 1.657 | 58.6 |
| | R19 = −102.696 | | | |

| Variable Air Spacing & Focal Length | | | |
| --- | --- | --- | --- |
| | Wide-Angle End | Middle | Tele-Photo End |
| d8 (mm) | 122.85 | 87.48 | 44.65 |
| f (mm) | 83.72 | 99.62 | 131.65 |

Referring to FIG. 3, a zoom lens system in accordance with another preferred embodiment of the present invention includes a first lens group I, movable for focusing and zooming, and a second lens group II, movable for zooming. The first lens group I, which has a negative overall power, comprises, as viewed from the image (screen) side, first to fifth lens components L11-L15. Specifically, the first and second lens components L11 and L12 comprise negative meniscus lenses, respectively, each of which is convex to the image (screen) side, the third lens component L13 comprises a meniscus lens convex to the subject side, the fourth lens component L14 comprises a bi-concave lens, and the fifth lens component L15 comprises a bi-convex lens. The second lens group II, which has a positive overall power, comprises, as viewed from the image (screen) side, sixth to eleventh lens components L16-L21. Specifically, the sixth lens component L16 comprises a bi-convex lens. The seventh and eighth lens components L17 and L18 comprise, respectively, a bi-concave lens and a bi-convex lens and are cemented to each other. The ninth lens component L19 comprises a plano-convex lens. The tenth lens component L20 comprises a bi-convex lens, and the eleventh lens component L21 comprises a positive meniscus lens convex to the subject side. Both the first and second lens groups I and II are movable along the optical axis X relative to each other so as to continuously vary a focal length of the optical system during zooming. When zooming up from a tele-photo end (T) to a wide-angle end (W), the first and second lens groups I and II are moved in opposite directions so as to decrease a distance d10 therebetween.

The zoom lens shown in FIG. 1 may be defined by the following equations:

$$bf_w/f_w = 2.64$$

$$f_1/f_2 = 0.83$$

$$f_c/f_2 = 0.21$$

where $f_1$ is the focal length of the first lens group I,
$f_2$ is the focal length of the second lens group II,
$f_w$ is the total focal length of the zoom lens at the wide-angle end, and
$bf_w$ is the axial distance from the back surface of the fourth lens component L10 of the second lens group II to a conjugate point P of the zoom lens on the subject side with respect to the zoom lens.

An example of properties of the zoom lens shown in FIG. 3 is specifically described in Table II.

TABLE II

| Component | Radius of Curvature (mm) | Axial Distance Between Surfaces (mm) | $N_d$ | $V_d$ |
| --- | --- | --- | --- | --- |
| L11 | R1 = 82.569 | d1 = 3.00 | 1.799 | 48.0 |
| | R2 = 50.417 | d2 = 9.37 | | |
| L12 | R3 = 162.329 | d3 = 3.00 | 1.799 | 48.0 |
| | R4 = 70.753 | d4 = 8.44 | | |
| L13 | R5 = −599.478 | d5 = 7.94 | 1.754 | 27.2 |
| | R6 = −75.467 | d6 = 0.20 | | |
| L14 | R7 = −78.680 | d7 = 3.00 | 1.799 | 48.0 |
| | R8 = 134.780 | d8 = 4.86 | | |
| L15 | R9 = 78.706 | d9 = 11.45 | 1.500 | 54.9 |
| | R10 = −160.663 | d10 (Variable) | | |
| | R11 = 129.663 | | | |
| L16 | R12 = −201.838 | d11 = 5.34 | 1.500 | 54.9 |
| | R13 = −53.377 | d12 = 32.72 | | |
| L17 | R14 = 45.674 | d13 = 9.01 | 1.790 | 47.6 |
| L18 | R15 = 100.006 | d14 = 14.99 | 1.800 | 48.0 |
| | R16 = 0.000 | d15 = 8.56 | | |
| L19 | R17 = 181.942 | d16 = 3.00 | 1.847 | 23.9 |
| | R18 = 692.519 | d17 = 2.30 | | |
| L20 | R19 = −86.764 | d18 = 8.72 | 1.500 | 65.0 |
| | R20 = −1864.120 | d19 = 0.20 | | |
| L21 | R21 = −103.909 | d20 = 8.15 | 1.499 | 65.0 |

| Variable Air Spacing & Focal Length | | | |
| --- | --- | --- | --- |
| | Wide-Angle End | Middle | Tele-Photo End |
| d10 (mm) | 96.51 | 65.60 | 27.93 |
| f (mm) | 83.64 | 99.53 | 131.31 |

Referring to FIG. 4, a zoom lens system in accordance with another preferred embodiment of the present invention includes a first lens group I, movable for focusing and zooming, and a second lens group II, movable for zooming. The first lens group I, which has a negative overall power and is divided into two separate spaced sub-groups fixed relative to each other, comprises, as viewed from the image (screen) side, first to fifth lens components L31-L35. Specifically, the first sub-group of the first lens group I comprises first to third lens components L31-L33, and the second sub-group of the first lens group I comprises fourth and fifth lens components L34 and L35. The first lens component L31 comprises a negative meniscus lens, which is convex to the image (screen) side, the second, third and fourth lens components L32, L33 and L34 comprise a bi-concave lens, a bi-convex lens and a bi-concave lens, respectively. The fifth lens component L35 comprises a positive meniscus lens, which is convex to the image (screen) side. The second lens group II, which has a positive overall power, comprises, as viewed from the image (screen) side, sixth to eleventh lens components L36-L41. Specifically, the sixth to ninth lens components L36 to L39 are cemented to one another and comprise a bi-convex lens, a bi-concave lens, a bi-convex lens and a bi-concave lens, respectively. Both the tenth and eleventh lens components L40 and L41 comprise bi-convex lenses. Both the first and second lens groups I and II are movable along the optical axis X relative to each other so as to continuously vary a focal length of the optical system during zooming. When zooming up from a tele-photo end (T) to a wide-angle end (W), the first and second lens groups I and II are moved in opposite directions so as to decrease a distance d10 therebetween.

The zoom lens shown in FIG. 1 may be defined by the following equations:

$$bf_w/f_w = 2.64$$

$$f_1/f_2 = 0.69$$

$$f_c/f_2 = 0.32$$

where
$f_1$ is the focal length of the first lens group I,
$f_2$ is the focal length of the second lens group II,
$f_w$ is the total focal length of the zoom lens at the wide-angle end, and
$bf_w$ is the axial distance from the back surface of the fourth lens component L10 of the second lens group II to a conjugate point P of the zoom lens on the subject side with respect to the zoom lens.

The properties of the zoom lens shown in FIG. 2 is specifically described in the following Table III.

TABLE III

| Component | Radius of Curvature (mm) | Axial Distance Between Surfaces (mm) | $N_d$ | $V_d$ |
|---|---|---|---|---|
| L31 | R1 = 99.594 | d1 = 3.00 | 1.799 | 48.0 |
| | R2 = 45.838 | d2 = 14.19 | | |
| L32 | R3 = −1297.200 | d3 = 3.00 | 1.799 | 48.0 |
| | R4 = 97.167 | d4 = 7.73 | | |
| L33 | R5 = 74.601 | d5 = 16.70 | 1.549 | 45.7 |
| | R6 = −95.185 | d6 = 48.08 | | |
| L34 | R7 = −138.791 | d7 = 3.00 | 1.800 | 48.0 |
| | R8 = 87.935 | d8 = 1.66 | | |
| L35 | R9 = 86.233 | d9 = 3.12 | 1.800 | 24.9 |
| | R10 = 300.249 | d10 (Variable) | | |
| L36 | R11 = 99.309 | d11 = 17.75 | 1.500 | 54.9 |
| | R12 = −45.768 | d12 = 9.01 | 1.730 | 54.9 |
| L37 | R13 = 56.327 | d13 = 25.51 | 1.799 | 35.3 |
| L38 | R14 = −55.211 | d14 = 9.00 | 1.847 | 23.9 |
| L39 | R15 = 165.069 | d15 = 2.23 | | |
| | R16 = 386.379 | | | |
| L40 | R17 = −102.362 | d16 = 11.00 | 1.708 | 56.0 |
| | R18 = 1111.000 | d17 = 0.20 | | |
| L41 | R19 = −156.019 | d18 = 10.00 | 1.799 | 47.9 |

| Variable Air Spacing & Focal Length | | | |
|---|---|---|---|
| | Wide-Angle End | Middle | Tele-Photo End |
| d10 (mm) | 36.41 | 22.80 | 5.83 |
| f (mm) | 83.70 | 99.60 | 131.40 |

In any zoom lens described above, the second lens group II includes two concave lens components. In order to provide the zoom lens with a long back focal length as well as desired optical characteristics, the first one of the two concave lens components as viewed from the image (screen) side is a bi-concave lens which is designed and adapted to have such a focal length $f_c$ that a ratio relative to an overall focal length $f_2$ of the second lens group satisfies the following condition:

$$0.2 < f_c/f_2 < 0.33$$

If the first concave lens component has a focal length that makes the ratio larger than the upper limit of 0.33, it is difficult for the zoom lens to have a large back focal length $bf_w$ at the wide-angle end (W). On the other hand, if the first concave lens component has a focal length that makes the ratio smaller than the lower limit of 0.2, it is difficult the zoom lens to have well corrected chromatic aberrations.

In any zoom lens described above, the second lens group II includes at least one convex lens component on each side of the respective concave lens component.

Figure 5:
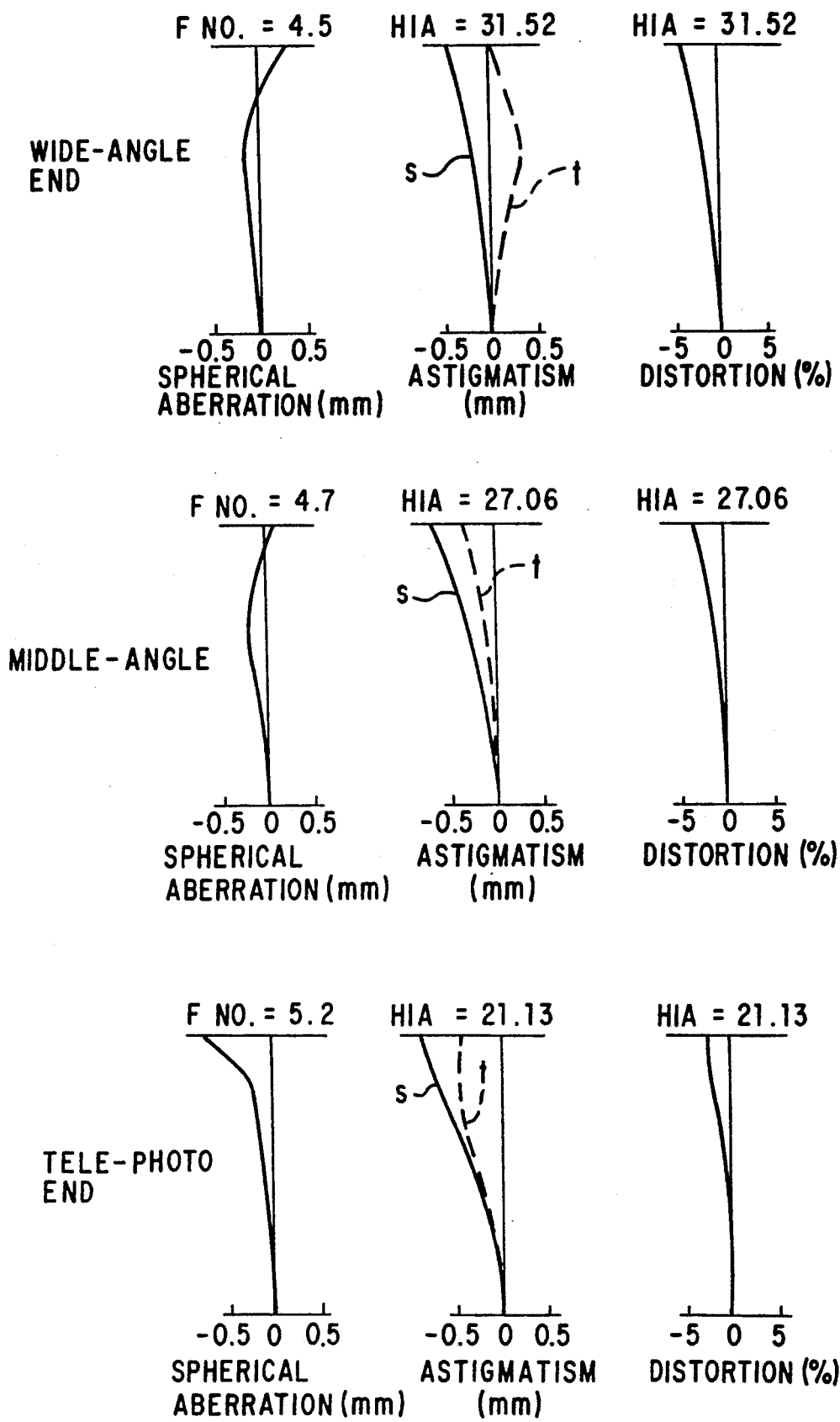
FIGS. 5 to 7 are graphics showing various aberrations of the zoom lens shown in FIGS. 2 to 4, respectively.
Figure 6:
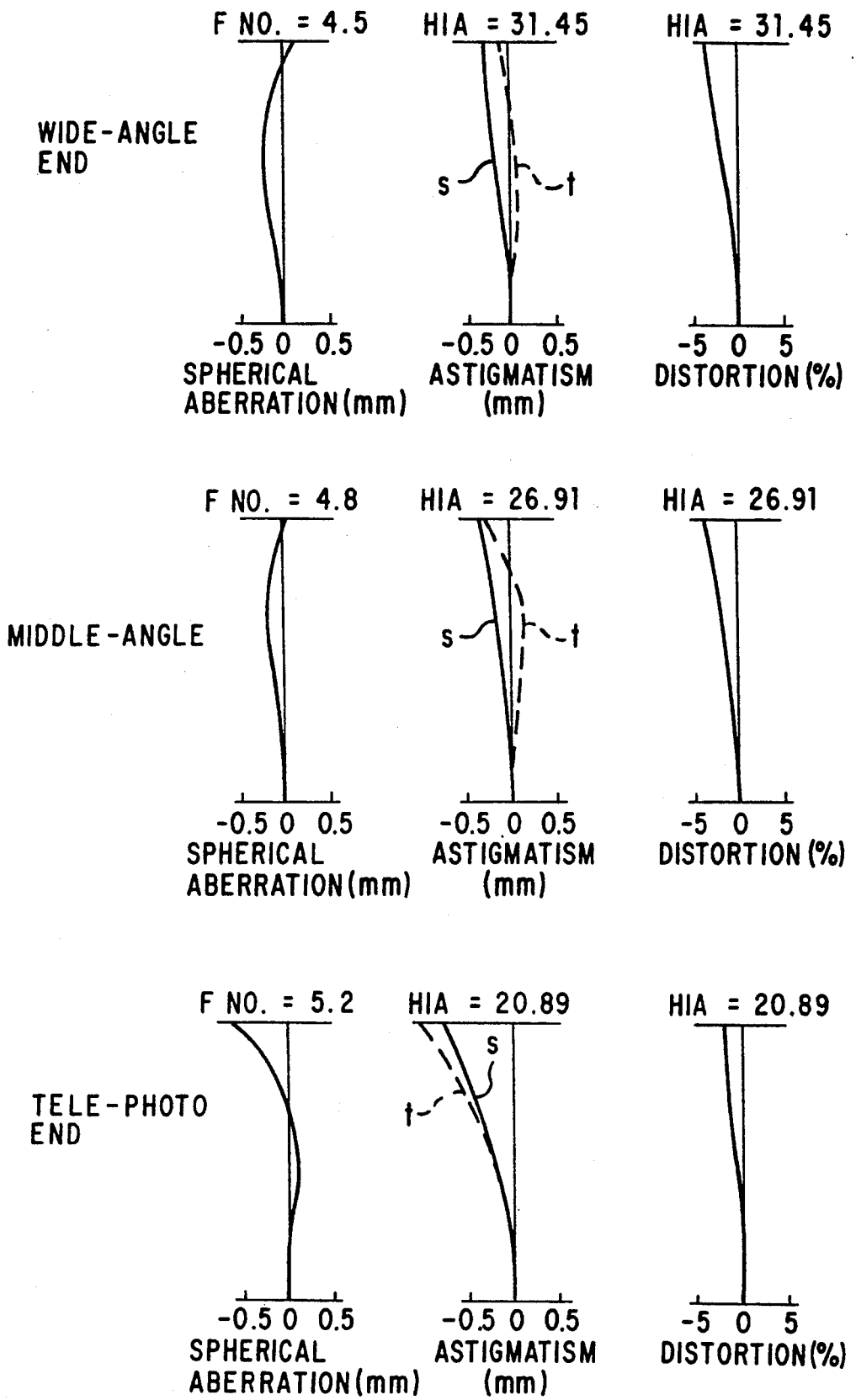
Figure 7:
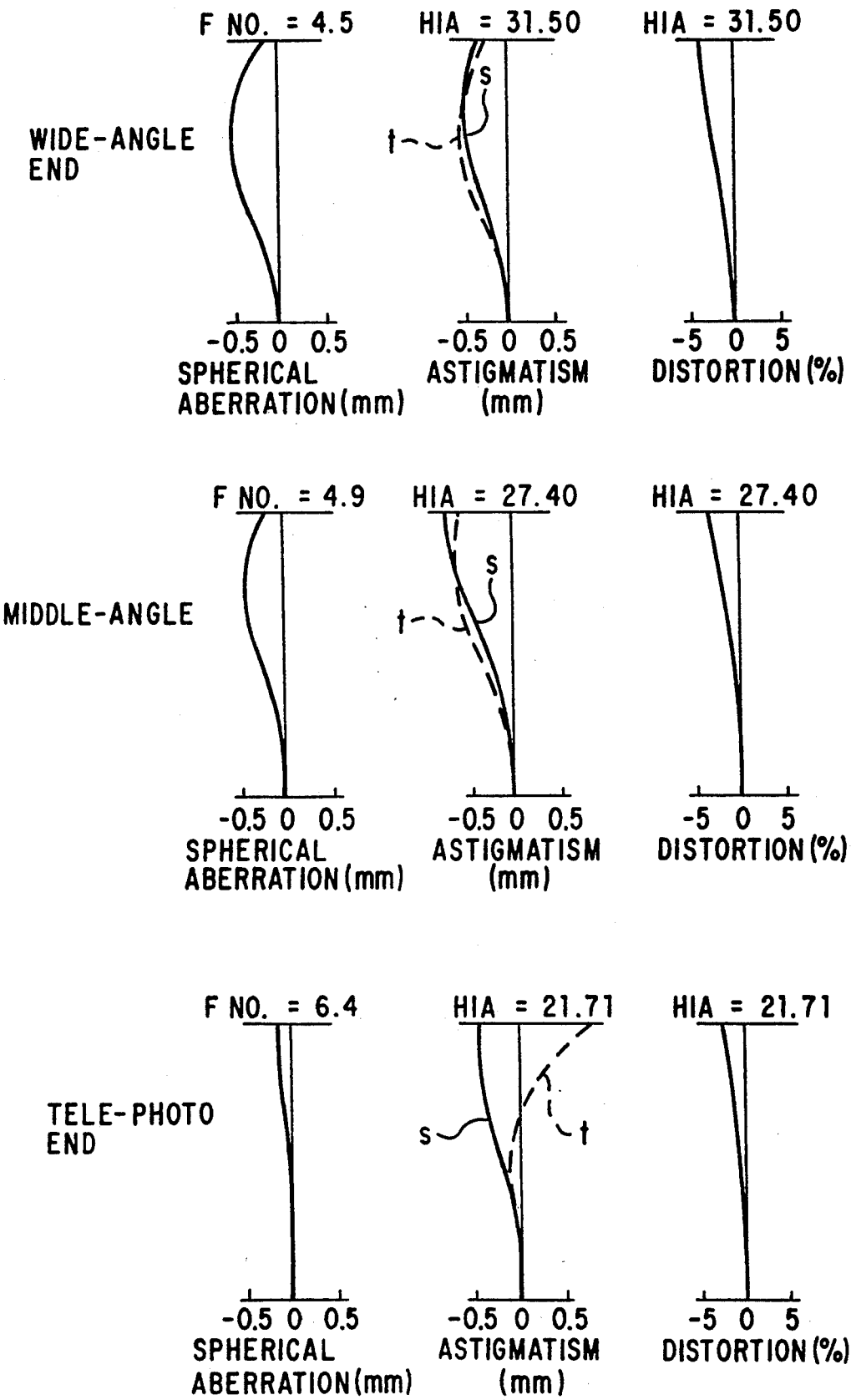

FIGS. 5 to 7 show various aberrations, such as a spherical aberration, astigmatism and distortion, of the zoom lenses shown in FIGS. 2 to 4. Such aberrations are shown for a wide-angle end (M), a middle angle (M) and a tele-photo end (T). In the graphics, HIA stands for a half image angle in degrees.

In the zoom lens of the present invention, the second lens group may comprise more than two concave lens components with the same results.

It is to be understood that although the zoom lens of the present invention has been described as being used with a 3LCD projector, it may be available for use with various optical instruments, such as TV cameras, overhead projectors, slide projectors, single lens reflex cameras, etc.

It is also to be understood that although the present invention has been described in detail with respect to preferred embodiments thereof, various other embodiments and variants may occur to those skilled in the art. Such other embodiments and variants which fall within the scope and spirit of the invention and are intended to be covered by the following claims.

What is claimed is:

1. A zoom lens comprising, from an image side to a subject side, a first lens group having a negative overall power and a second lens group having a positive overall power, the first and second lens groups being movable relative to each other in opposite directions so as to increasingly and decreasingly change an optical distance between said first and second lens groups, thereby varying an overall focal length of the zoom lens, said zoom lens satisfying the following conditions:

$$2.5 < bf_w/f_w, \text{ and}$$

$$0.68 < |f_1|/f_2 < 0.98,$$

where $f_1$ is a focal length of the first lens group, $f_2$ is a focal length of the second lens group, $f_w$ is a total focal length of the zoom lens at a wide-angle end, and $bf_w$ is an axial distance from a rearmost surface of the second lens group to a conjugate point of the second lens group on the subject side with respect to the zoom lens and wherein said second lens group includes at least two concave lens components, a first one of said two concave lens components from the subject side satisfying the following condition:

$0.2 < f_c/f_2 < 0.33$;

where $f_c$ is the focal length of said first one of said two concave lens components.

2. A zoom lens as defined in claim 1 and scaled to an equivalent focal length of 131.44 mm to a shortest focal length of 83.72 mm substantially as described:

| Component | Radius of Curvature (mm) | Axial Distance Between Surfaces (mm) | $N_d$ | $V_d$ |
|---|---|---|---|---|
| L1 | R1 = 89.316 | d1 = 3.00 | 1.800 | 47.9 |
|  | R2 = 48.437 | d2 = 10.10 |  |  |
| L2 | R3 = 192.132 | d3 = 3.00 | 1.800 | 47.9 |
|  | R4 = 75.376 | d4 = 8.56 |  |  |
| L3 | R5 = −287.895 | d5 = 3.00 | 1.799 | 47.9 |
|  | R6 = 225.146 | d6 = 2.66 |  |  |
| L4 | R7 = 82.196 | d7 = 11.17 | 1.618 | 36.1 |
|  | R8 = −175.889 | d8 (Variable) |  |  |
| L5 | R9 = 103.111 | d9 = 13.48 | 1.500 | 54.9 |
|  | R10 = −84.622 | d10 = 6.25 |  |  |
| L6 | R11 = −51.016 | d11 = 9.00 | 1.641 | 59.4 |
|  | R12 = 56.948 |  |  |  |
| L7 | R13 = −54.657 | d12 = 22.23 | 1.642 | 59.4 |
|  |  | d13 = 0.20 |  |  |
| L8 | R14 = −64.669 | d14 = 9.00 | 1.799 | 25.0 |
|  | R15 = 264.366 | d15 = 3.66 |  |  |
| L9 | R16 = −321.759 | d16 = 7.42 | 1.571 | 62.2 |
|  | R17 = −77.232 | d17 = 0.20 |  |  |
| L10 | R18 = −3050.969 | d18 = 7.66 | 1.657 | 58.6 |
|  | R19 = −102.696 |  |  |  |

| Variable Air Spacing & Focal Length | | |
|---|---|---|
| Wide-Angle End | Middle-angle | Tele-Photo End |
| d8 (mm) 122.85 | 87.48 | 44.65 |
| f (mm) 83.72 | 99.62 | 131.65 | where the zoom lens comprises lens components $L_1$ to $L_{10}$ having surfaces $R_1$ to $R_{19}$, the index of refraction is given by $N_d$ for D spectrum, the dispersion is measured by the Abbe Number as given by $V_d$ for D spectrum, and axial distances are given by d1 to d18 in millimeters (mm).

3. A zoom lens as defined in claim 1 and scaled to an equivalent focal length of 83.72 mm to 131.44 mm substantially as described:

| Component | Radius of Curvature (mm) | Axial Distance Between Surfaces (mm) | $N_d$ | $V_d$ |
|---|---|---|---|---|
| L11 | R1 = 82.569 | d1 = 3.00 | 1.799 | 48.0 |
|  | R2 = 50.417 | d2 = 9.37 |  |  |
|  | R3 = 162.329 |  |  |  |
| L12 | R4 = 70.753 | d3 = 3.00 | 1.799 | 48.0 |
|  |  | d4 = 8.44 |  |  |
| L13 | R5 = −599.478 | d5 = 7.94 | 1.754 | 27.2 |
|  | R6 = −75.467 | d6 = 0.20 |  |  |
| L14 | R7 = −78.680 | d7 = 3.00 | 1.799 | 48.0 |
|  | R8 = 134.780 | d8 = 4.86 |  |  |
|  | R9 = 78.706 |  |  |  |
| L15 | R10 = −160.663 | d9 = 11.45 | 1.500 | 54.9 |
|  |  | d10 (Variable) |  |  |
|  | R11 = 129.663 |  |  |  |
| L16 | R12 = −201.838 | d11 = 5.34 | 1.500 | 54.9 |
|  |  | d12 = 32.72 |  |  |
|  | R13 = −53.377 |  |  |  |
| L17 | R14 = 45.674 | d13 = 9.01 | 1.790 | 47.6 |
| L18 |  | d14 = 14.99 | 1.800 | 48.0 |
|  | R15 = 100.006 | d15 = 8.56 |  |  |
|  | R16 = 0.000 |  |  |  |
| L19 | R17 = 181.942 | d16 = 3.00 | 1.847 | 23.9 |
|  |  | d17 = 2.30 |  |  |
|  | R18 = 692.519 |  |  |  |
| L20 | R19 = −86.764 | d18 = 8.72 | 1.500 | 65.0 |
|  |  | d19 = 0.20 |  |  |
|  | R20 = −1864.120 |  |  |  |
| L21 |  | d20 = 8.15 | 1.499 | 65.0 |
|  | R21 = −103.909 |  |  |  |

| Variable Air Spacing & Focal Length | | |
|---|---|---|
| Wide-Angle End | Middle-Angle | Tele-Photo End |
| d10 (mm) 96.51 | 65.60 | 27.93 |
| f (mm) 83.64 | 99.53 | 131.31 | where the zoom lens comprises lens components $L_{11}$ to $L_{21}$ having surfaces $R_1$ to $R_{21}$, the index of refraction is given by $N_d$ for D spectrum, the dispersion is measured by the Abbe Number as given by $V_d$ for D spectrum, and axial distances are given by d1 to d20 in millimeters (mm).

4. A zoom lens as defined in claim 1 and scaled to an equivalent focal length of 83.72 mm to 131.44 mm substantially as described:

| Component | Radius of Curvature (mm) | Axial Distance Between Surfaces (mm) | $N_d$ | $V_d$ |
|---|---|---|---|---|
| L31 | R1 = 99.594 | d1 = 3.00 | 1.799 | 48.0 |
|  | R2 = 45.838 | d2 = 14.19 |  |  |
|  | R3 = −1297.200 |  |  |  |
| L32 | R4 = 97.167 | d3 = 3.00 | 1.799 | 48.0 |
|  |  | d4 = 7.73 |  |  |
|  | R5 = 74.601 |  |  |  |
| L33 | R6 = −95.185 | d5 = 16.70 | 1.549 | 45.7 |
|  |  | d6 = 48.08 |  |  |
|  | R7 = −138.791 |  |  |  |
| L34 | R8 = 87.935 | d7 = 3.00 | 1.800 | 48.0 |
|  |  | d8 = 1.66 |  |  |
|  | R9 = 86.233 |  |  |  |
| L35 | R10 = 300.249 | d9 = 3.12 | 1.800 | 24.9 |
|  |  | d10 (Variable) |  |  |
|  | R11 = 99.309 |  |  |  |
| L36 |  | d11 = 17.75 | 1.500 | 54.9 |

-continued

| | | | | |
|---|---|---|---|---|
| | R12 = −45.768 | | | |
| L37 | | d12 = 9.01 | 1.730 | 54.9 |
| | R13 = 56.327 | | | |
| L38 | | d13 = 25.51 | 1.799 | 35.3 |
| | R14 = −55.211 | | | |
| L39 | | d14 = 9.00 | 1.847 | 23.9 |
| | R15 = 165.069 | | | |
| | | d15 = 2.23 | | |
| | R16 = 386.379 | | | |
| L40 | | d16 = 11.00 | 1.708 | 56.0 |
| | R17 = −102.362 | | | |
| | | d17 = 0.20 | | |
| | R18 = 1111.000 | | | |
| L41 | | d18 = 10.00 | 1.799 | 47.9 |

-continued

| R19 = −156.019 | | | |
|---|---|---|---|
| Variable Air Spacing & Focal Length | | | |
| | Wide-Angle End | Middle-Angle | Tele-Photo End |
| d10 (mm) | 36.41 | 22.80 | 5.83 |
| f (mm) | 83.70 | 99.60 | 131.40 | where the zoom lens comprises lens components $L_{31}$ to $L_{41}$ having surfaces $R_1$ to $R_{19}$, the index of refraction is given by $N_d$ for D spectrum, the dispersion is measured by the Abbe Number as given by $V_d$ for D spectrum, and axial distances are given by d1 to d18 in millimeters (mm).

* * * * *